(12) United States Patent
Schicke

(10) Patent No.: US 6,892,735 B2
(45) Date of Patent: May 17, 2005

(54) LIQUID COOLING SYSTEM FOR PRODUCTION MACHINES OF THE TOBACCO-PROCESSING INDUSTRY

(75) Inventor: Joachim Schicke, Wentorf (DE)

(73) Assignee: Hauni Maschinenbau AG, Hamburg (DE)

( * ) Notice: Subject to any disclaimer, the term of this patent is extended or adjusted under 35 U.S.C. 154(b) by 17 days.

(21) Appl. No.: 10/275,441

(22) PCT Filed: Apr. 25, 2001

(86) PCT No.: PCT/EP01/04637

§ 371 (c)(1),
(2), (4) Date: Nov. 6, 2002

(87) PCT Pub. No.: WO01/84970

PCT Pub. Date: Nov. 15, 2001

(65) Prior Publication Data

US 2003/0136133 A1 Jul. 24, 2003

(30) Foreign Application Priority Data

May 6, 2000 (DE) .......................... 100 22 138

(51) Int. Cl.⁷ ............................ F25D 23/12; A24C 5/24

(52) U.S. Cl. ...................................... 131/280; 62/259.2
(58) Field of Search ......................... 62/62, 259.2, 434, 62/432, 79, 203, 407, 118; 131/280

(56) References Cited

U.S. PATENT DOCUMENTS

| 5,462,071 A | 10/1995 | Heitmann |
| 5,523,640 A | 6/1996 | Sparer et al. |
| 6,418,748 B1 * | 7/2002 | Kramer ....................... 62/434 |

FOREIGN PATENT DOCUMENTS

| DE | 695 03 234 | 10/1998 |
| EP | 0 313 473 A2 | 4/1989 |
| EP | 0 709 625 A2 | 5/1996 |
| WO | WO 9963799 A1 | 12/1999 |

* cited by examiner

*Primary Examiner*—Dionne A. Walls
(74) *Attorney, Agent, or Firm*—Venable LLP; Catherine M. Voorhees

(57) ABSTRACT

A liquid cooling arrangement is provided for machine components of production machines of the tobacco-processing industry. The arrangement includes a closed liquid cooling system having at least two liquid loops.

16 Claims, 3 Drawing Sheets

LIQUID COOLING SYSTEM FOR PRODUCTION MACHINES OF THE TOBACCO-PROCESSING INDUSTRY

This application is a 371 of PCT/EP01/04637, filed on Apr. 25, 2001.

BACKGROUND OF THE INVENTION

The invention relates to a liquid cooling system for machine components of production machines of the tobacco-processing industry.

In accordance with the invention, the term "production machines of the tobacco-processing industry" encompasses machines, their individual components, and control units (switch cabinets) used to produce products for smoking and their filter components, packaging machines for such articles, handling and conveying units incorporated into production lines comprising such machines, and machines and devices for processing tobacco, at least those employing high-power drive units or large heat generators.

U.S. Pat. No. 5,462,071 discloses an arrangement for limiting the operating temperature of tobacco-processing production machines in climate-controlled operating spaces. Here, the production machines or their individual components are provided with a liquid cooling system that is connected to a re-cooling device installed outside of the operating space. The cooling liquid for production machines, such as cigarette machines or filter-attachment machines, is supplied to the cooling units to be cooled of these machines and, after being heated, is conveyed out of the operating space, then returned to the operating space and the units of the production machines after being re-cooled.

SUMMARY OF THE INVENTION

It is an object of the invention to improve the cooling of tobacco-processing production machines described above.

In accordance with the invention, this object is accomplished by dividing the liquid cooling system, which is embodied as a closed system, into at least two liquid loops.

According to an important modification of the invention, high-power machine components are integrated into a first liquid loop, while low-power machine components are integrated into a second liquid loop. The first and second loops may also comprise a plurality of sub-loops.

In a further embodiment of the invention, the first liquid loop is provided for cooling high-power machine components in the form of motorized drives. The second liquid loop can then be provided for cooling low-power machine components in the form of control elements and/or vacuum pumps.

The aforementioned low-power machine components, particularly control elements such as switch cabinets and the like, are generally cooled with air. In accordance with the invention, the air warmed by the cooling process is supplied to a heat exchanger through which a cooling liquid from the second liquid loop flows and in which the cooling air flowing through the heat exchanger is re-cooled.

According to one advantageous modification of the invention, the cooling liquid that has absorbed heat from the cooling air flowing through a heat exchanger of the second liquid loop, and/or the cooling liquid that has absorbed heat in the first liquid loop, particularly from motor drives, is supplied to a heat exchanger, through which air or liquid flows for re-cooling the cooling liquids.

Water is preferably used for the aforementioned cooling liquids of the first and/or second liquid loop(s) and the liquid for absorbing the heat from these liquids, but because the loops are closed, other suitable liquids may also be provided.

One or more heat exchangers for re-cooling the cooling liquids by means of air or liquid is or are advantageously disposed above a production machine, i.e., above its upper limit surfaces, if sufficient space is available, because in that case, no valuable space next to a machine need be occupied. It is also possible, however, to position a heat exchanger next to a production machine, or even outside of the operating space in which production machines are located. It is also possible to provide only one heat exchanger for a plurality of production machines, thereby positioning it above or next to a production machine or outside of the operating space.

According to a preferred embodiment of the invention, which is inventive in and of itself, the pipelines required for conveying the cooling liquid can be made of metal, particularly aluminum, that is coated on the inside and outside with resistant plastic. The inner coating can consist, for example, of so-called PE-Xc material, which is corrosion-resistant, while the outer coating may consist of so-called PE-X material. The latter material is especially resistant to mechanical stresses. As described in the above, pipelines have greater dimensional stability than purely plastic pipes because the metal pipe, if aluminum is used for the pipe, can be bent easily and permits small bending radii. The inside of the pipelines is especially resistant to chemical stress, while the outside is highly resistant to mechanical stress. It is particularly simple to press the pipes into so-called pressing sleeves for connecting them to other pipelines. Pipes of the described type are sold under the name "Polyfix MT" by the company POLYTHERM GMBH, 48607 Ochtrup, Germany.

The invention has the following advantages:

The two liquid loops can be adapted to one another such that the consumers match in terms of temperature and output. Therefore, the pipe cross-sections and pumps can be kept small. If one liquid loop (pump, ventilator, heat exchanger) malfunctions, the other liquid loop can continue to operate. The cooling system according to the invention can be structured inside the machine such that the pipes, motors and electrical switch cabinets remain unchanged.

BRIEF DESCRIPTION OF THE DRAWINGS

The invention is described in detail by way of an exemplary embodiment with the aid of the following drawings figures in which like reference characters represent like elements, and wherein.

DETAILED DESCRIPTION OF PREFERRED EMBODIMENTS OF THE INVENTION

Figure 1:
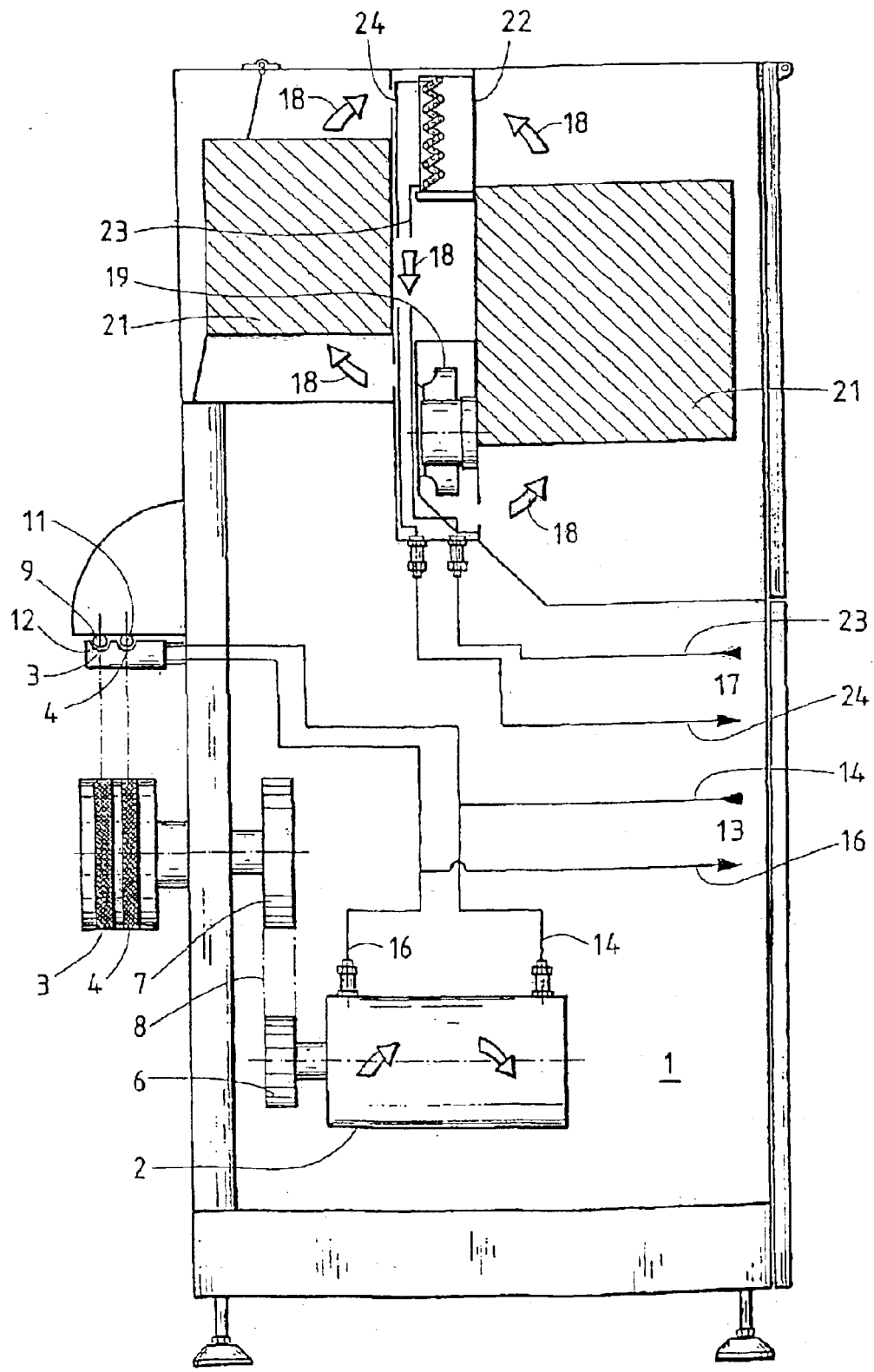
FIG. 1 shows a schematic representation of an embodiment of the invention having two liquid cooling loops, of which one (first liquid loop) has high-power consumers, while a second (second liquid loop) has low-power consumers.

FIG. 1 schematically illustrates a cigarette machine 1, for example of the known type PROTOS 90 or PROTOS 2 of the Applicant, comprising a filter-rope producing machine A and a connected filter-attachment machine B (FIG. 2) for producing cigarettes. The drive motors of the machine 1 are symbolized with block 2. The motors may be used for the primary drives, for example for driving fans, not shown in further detail, of a feeder, a traction roller, a rotating knife holder and two format belts 3 and 4. The respective moment transmission is symbolized by toothed disks 6, 7 and a toothed belt 8. A first, closed liquid loop 13—for this example a cooling-water loop—is provided for cooling the aforementioned motors, shown in block 2, and the format belts 3 and 4, which move cigarette cylinders 9 or 11 in a format console 12 while exerting considerable frictional forces and generating correspondingly high frictional temperatures. For this example, cool water is conveyed through the pipelines (pipe) 14 of the first loop to the high-power motors 2 and the format console 12. The warmed water is conveyed through the pipes 16 to a re-cooling device, which is not shown in FIG. 1, but is described in conjunction with FIGS. 2 and 3. A second closed liquid loop 17—also a cooling-water loop for this example—serves to cool cooling air 18, which is generated by a fan 19 and flows through the electrical control elements, e.g. the switch cabinets 21, and is heated in the process. For re-cooling the cooling air 18, a heat exchanger 22 is provided inside the cigarette machine 1; cool water is supplied to this exchanger through the pipeline 23 (pipe) and carried off again through the pipe 24.

Figure 2:
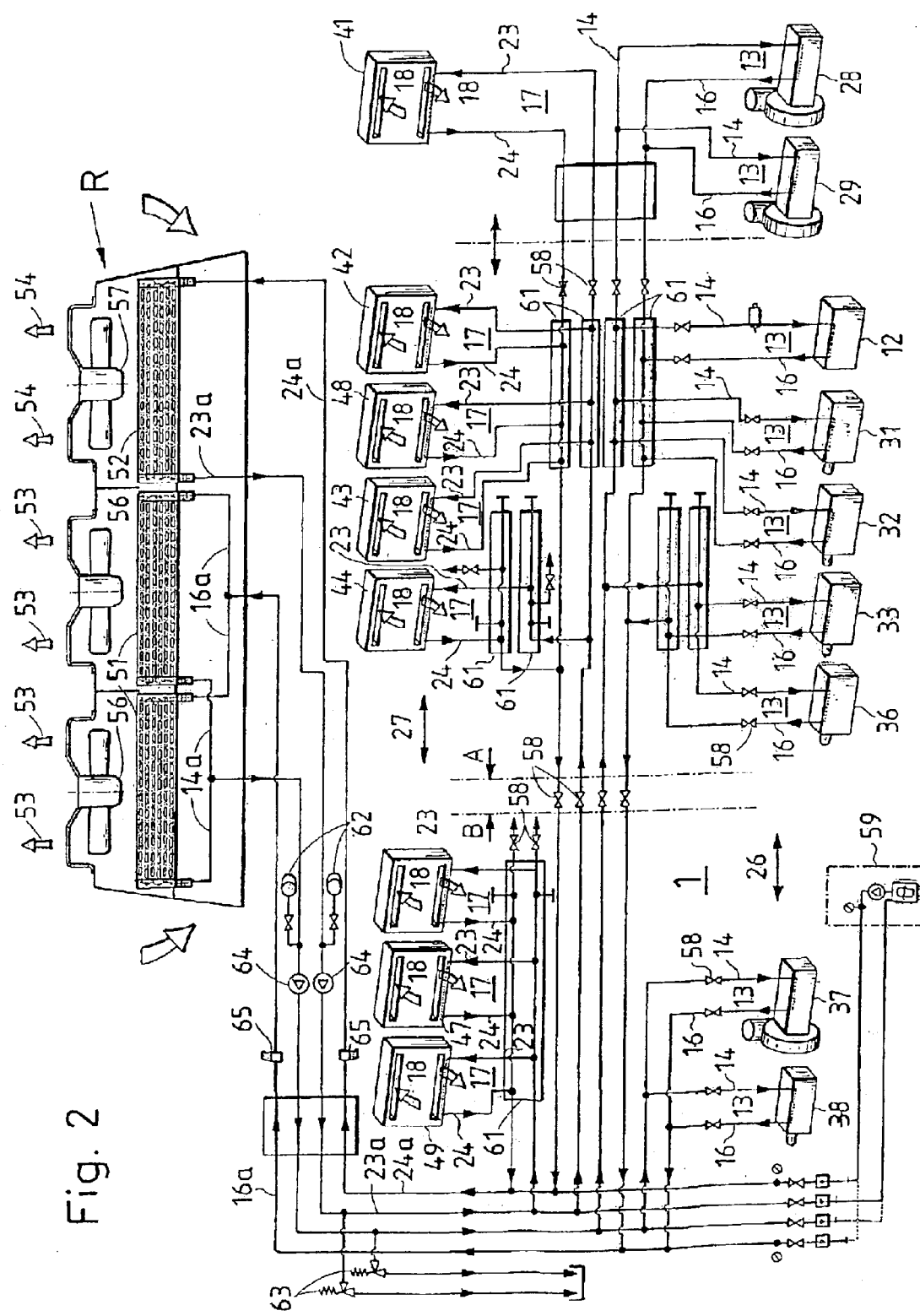
FIG. 2 shows a representation of the cooling system of a filter-cigarette production system comprising a cigarette machine and a filter-attachment machine, and having two liquid loops and the associated high-power and/or low-power machine components, as well as a system for re-cooling the cooling liquids with air.

FIG. 2 illustrates a first group 26 of high-power machine components, which are cooled by a first cooling-water loop 13. A second group 27, comprising low-power machine components, is cooled by a second cooling-water loop 17. The first group 26 of energy consumers includes for example high-power electromotive drives of a cigarette machine 1 comprising a cigarette-rope machine A and a filter-attachment machine B. The cigarette machine has a drive 28 for a suction fan, a drive 29 for a circulation fan, a drive 31 for traction rollers, a drive 32 for format belts (3, 4 in FIG. 1), a drive 33 for a rotating knife holder, a drive 36 for a rotating feeder arrangement, a drive 37 for a fan of a filter-attachment machine and a main drive 38 for the filter-attachment machine itself. A format console to be cooled is represented by 12 (FIG. 1). The aforementioned units with drives 28–38 of the first group 26 are well known in cigarette-production technology, and need not be discussed in detail here. They are supplied with cooling water by the first cooling-water loop 13 via the pipes 14; the water absorbs heat and carries it off via the pipes 16.

The second group 27 of energy consumers includes low-power energy consumers of the cigarette machine 1, namely switching cabinets 41, 42, 43, 44, 46 and 47, which are disposed in the machine and have control elements, as well as control consoles 48 with operating panels and a vacuum pump 49. The aforementioned switch cabinets can, at least to some extent, control the electromotive drives of the group 26. A second cooling-water loop 17 employs heat exchangers that are not shown herein (corresponding to position 22 in FIG. 1) to cool cooling air (corresponding to position 18 in FIG. 1) that is forced by fans (corresponding to position 19 in FIG. 1) through the switching cabinets with the control elements (position 21 in FIG. 1), thereby cooling the control elements. The cooling water is supplied to the heat exchangers through the pipes 23, and flows back via the pipes 24 after absorbing heat.

The cooling water flowing away from the two cooling-water loops 13 and 17 travels through collection lines 16a and 24a, respectively, to a re-cooling device R having heat exchangers 51 and 52, in which the water is re-cooled by streams of cooling air 53 and 54. Ventilators 56 and 57 suck the air streams through the heat exchangers. The cooled water of the cooling-water loops 13 and 17 travels through collection lines 14a and 23a, respectively, back to the consumers of the groups 26 and 27 that are to be cooled.

Double triangles approximately corresponding to position 58 represent stop valves, while 59 represents a filling device, 61 represents valve units, 62 indicates diaphragm-compensation containers, 63 represents safety valves, 64 indicates pumps and 65 indicates air separators.

Figure 3:
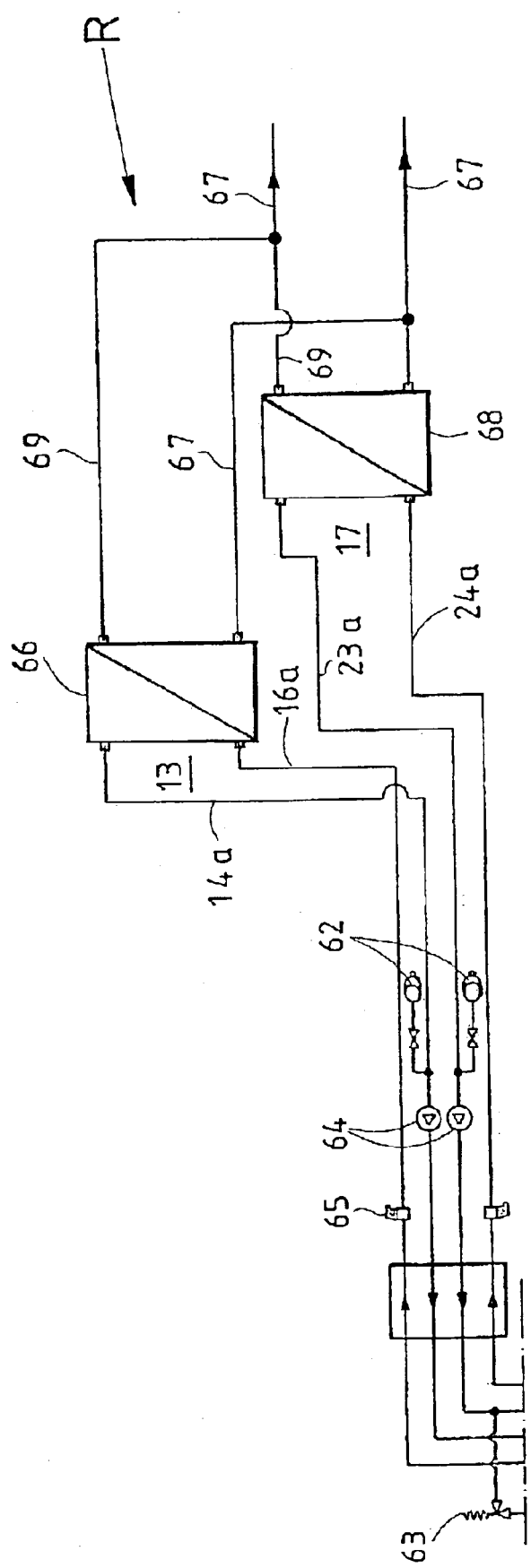
FIG. 3 shows a cooling system that corresponds to the cooling system described in FIG. 2, but which, unlike the cooling system in FIG. 2, uses a liquid to re-cool the cooling liquids.

FIG. 3 depicts a variation of the re-cooling device R for the heated cooling water of the first water loop and the second water loop 17. The heated water of the first water loop 13 is conveyed through pipelines 16a to a heat exchanger 66, which is supplied with a cooling liquid, preferably cooling water, via a pipeline 67. The water of the first water loop 13 that is cooled in the heat exchanger 66 travels back to the consumers of the first group 26 through a pipe 14a; the consumers are cooled as described in conjunction with FIGS. 1 and 2. The heated water of the second water loop 17 is conveyed to a heat exchanger 68 through the pipeline 24a; a cooling liquid, preferably cooling water, is also supplied to this heat exchanger through the pipeline 67. The water of the second water loop that is cooled in the heat exchanger 68 travels back to the consumers of the second group 27 through the pipe 23a; the consumers are cooled as described in conjunction with FIGS. 1 and 2. The heated cooling water (re-cooling water) from the heat exchangers 66 and 68 is carried off through a pipeline 69.

The re-cooling devices R with units 51–57, 66 and 68 are advantageously disposed above a production machine 1, specifically above its upper edge surfaces, to conserve space. They can, however, also be disposed next to a machine. A cooling device for two or more production machines can also be disposed above or next to one of the machines. Finally, the re-cooling devices can also be disposed outside of the operating space in which the production machines are located. If a cooling-water supply is provided, it can supply one or both cooling-water loops 13 and 17 directly with cooling water, so that the re-cooling devices R can be eliminated. An emergency connection to a water supply can be provided for emergencies in case of a malfunction of the re-cooling device.

What is claimed is:

1. A liquid cooling arrangement for machine components of a production machines of the tobacco-processing industry, comprising:

a closed liquid cooling system having at least two liquid loops for cooling said machine components;

high-power machine components integrated into a first liquid loop of the at least two liquid loops, wherein the high-power machine components include motorized drives; and low-power machine components integrated into a second liquid loop of the at least two liquid loops; wherein the second liquid loop comprises a first heat exchanger, means for circulating cooling air through the low power machine components for cooling said components and through the first heat exchanger, and means for circulating cooling liquid of said second liquid loop through the first heat exchanger for re-cooling the cooling air circulating through the first heat exchanger.

2. The liquid cooling system according to claim 1, wherein the second liquid loop is provided for cooling the low-power machine components and the low-power machine components are control elements.

3. The liquid cooling system according to claim 1, wherein the cooling liquid of the second liquid loop that absorbs heat from the cooling air in the first heat exchanger and cooling liquid for the motorized drives is supplied to a second heat exchanger, through which the heat-absorbing air or heat-absorbing liquid flows.

4. The liquid cooling system according to claim 1, wherein the cooling liquid is water.

5. The liquid cooling system according to claim 1, wherein the first heat exchanger is disposed above a production machine.

6. The liquid cooling system according to claim 1, wherein the first heat exchanger is disposed one of next to a production machine and outside of an operating space.

7. The liquid cooling system according to claim 1, further comprising pipelines for cooling liquid of the cooling system, wherein the pipelines for the cooling liquid are made of metal and are coated on the inside with PE-Xc material and on the outside with PE-X material.

8. A tobacco-processing arrangement of the tobacco-processing industry, comprising:
- a production machine having machine components;
- a liquid cooling arrangement having a closed liquid cooling system with at least two liquid loops for cooling the machine components of the production machine;
- high-power machine components integrated into a first liquid loop of the at least two liquid loops; and
- low-power machine components integrated into a second liquid loop of the at least two liquid loops.

9. The arrangement according to claim 8, wherein the first liquid loop is provided for cooling the high-power machine components and the high-power machine components are motorized drives.

10. The arrangement according to claim 9, further comprising a first heat exchanger, wherein the second liquid loop comprises the first heat exchanger, means for circulating cooling air through the low power machine components for cooling said components and through the first heat exchanger, and means for circulating cooling liquid of said second liquid loop through the first heat exchanger for re-cooling, the cooling air circulating through the first heat exchanger.

11. The arrangement according to claim 10, wherein the cooling liquid of the second liquid loop that absorbs heat from the cooling air in the first heat exchanger and cooling liquid for the motorized drives supplied to a second heat exchanger, through which the heat-absorbing air or heat-absorbing liquid flows.

12. The arrangement according to claim 10, wherein the first heat exchanger is disposed above a production machine.

13. The arrangement according to claim 10, wherein the first heat exchanger is disposed one of next to the production machine and outside of an operating space.

14. The arrangement according to claim 8, wherein the second liquid loop is provided for cooling the low-power machine components and the low-power machine components are control elements.

15. The arrangement according to claim 8, wherein the cooling liquid is water.

16. The arrangement according to claim 8, further comprising pipelines for cooling liquid of the cooling system, wherein the pipelines for the cooling liquid are made of metal and are coated on the inside with PE-Xc material and on the outside with PE-X material.

* * * * *